United States Patent [19]

Douchy et al.

[11] Patent Number: 4,906,292
[45] Date of Patent: Mar. 6, 1990

[54] COMPOSITE ARTICLE HAVING A TUBULAR SHEATH CONTAINING A COMPACTED MATERIAL, FOR THE TREATMENT OF LIQUID METALS, AND PROCESS FOR THE PRODUCTION OF SAID ARTICLE

[75] Inventors: Michel Douchy; Edmond Vachiery, both of Solesmes, France

[73] Assignee: Vallourec, France

[21] Appl. No.: 147,048

[22] Filed: Jan. 22, 1988

Related U.S. Application Data

[63] Continuation of Ser. No. 16,228, Feb. 19, 1987, abandoned.

[30] Foreign Application Priority Data

Feb. 24, 1986 [FR] France ................ 86 03295

[51] Int. Cl.$^4$ .................................................. C21C 7/02
[52] U.S. Cl. ............................................. 75/53; 75/58
[58] Field of Search ........................................ 75/53, 58

[56] References Cited

U.S. PATENT DOCUMENTS

| | | | |
|---|---|---|---|
| 1,588,761 | 6/1926 | Licot | 219/145.22 |
| 1,629,748 | 5/1927 | Stoody | 219/145.22 |
| 2,576,698 | 11/1951 | Russam | 428/75 |
| 2,892,007 | 6/1959 | Rickards | 174/102 R |
| 3,474,518 | 10/1969 | Strandell | 219/145.22 |
| 3,915,693 | 10/1975 | Rasmussen | 75/83 |
| 4,012,621 | 3/1977 | Uchida | 148/9 C |
| 4,126,446 | 11/1978 | Knorre | 75/93 G |
| 4,134,196 | 1/1979 | Yamaji | 29/420 |
| 4,137,446 | 1/1979 | Blaupain | 219/145 |
| 4,174,962 | 11/1979 | Frantzreb | 75/53 |
| 4,220,031 | 9/1980 | Naslund | 72/379 |
| 4,364,770 | 12/1982 | Douchy | 75/58 |
| 4,486,227 | 12/1984 | Douchy | 75/58 |

*Primary Examiner*—Peter D. Rosenberg
*Attorney, Agent, or Firm*—Jones, Day, Reavis & Pogue

[57] ABSTRACT

The invention concerns a composite article with a tubular metal sheath containing a compacted powdery or granular material.

The article is of substantially circular cross section (153). Its sheath comprises at least one closed fold (154), the fold edge (156) of which is within the compacted material. The article is produced by forming an open fold along a generatrix of a circular metal sheath containing a non-consolidated powdery or granular material and then constricting the sheath so as to close the fold.

The article is used for the treatment of meal baths, for example for the treatment of steel in a ladle.

37 Claims, 2 Drawing Sheets

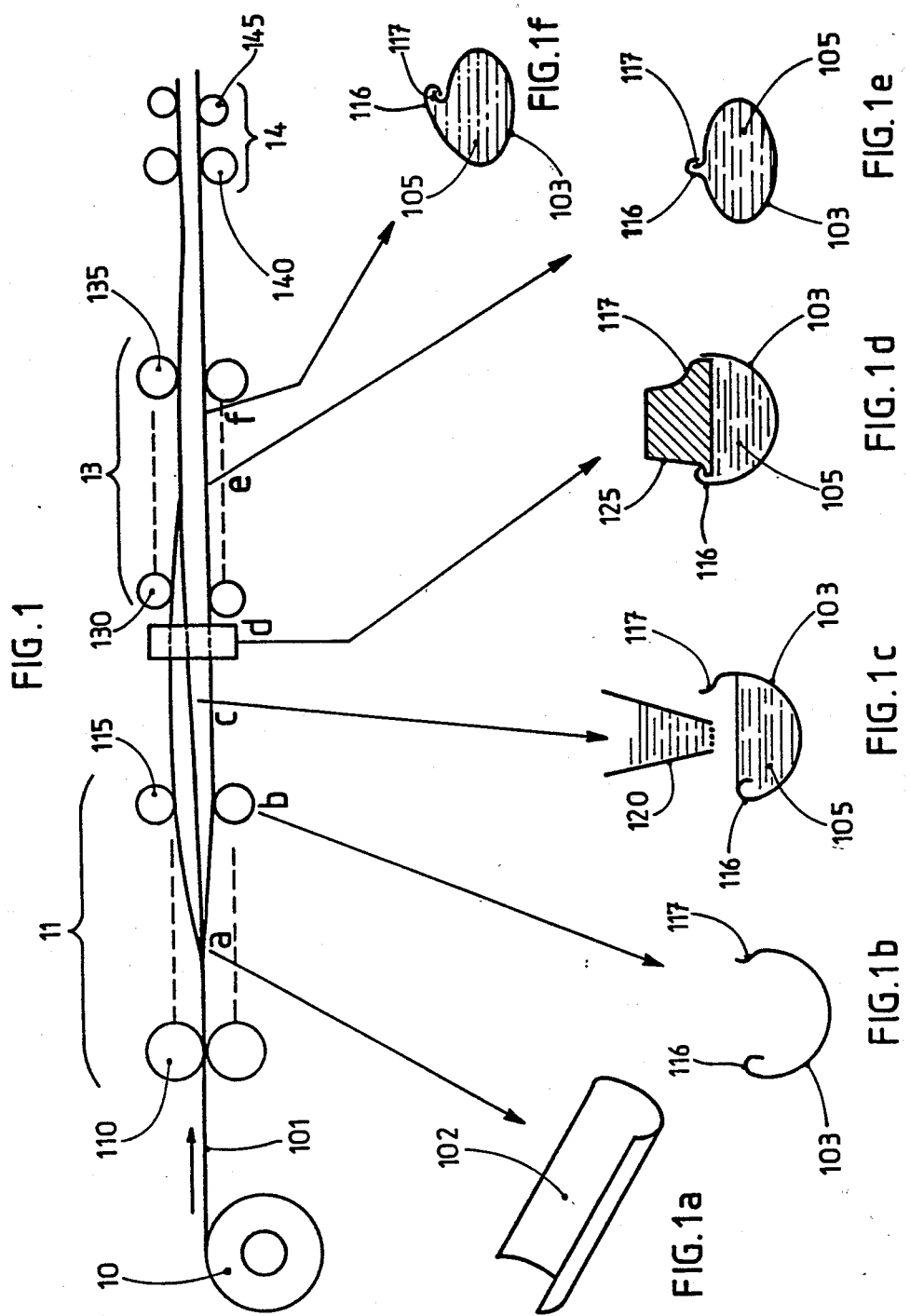

COMPOSITE ARTICLE HAVING A TUBULAR SHEATH CONTAINING A COMPACTED MATERIAL, FOR THE TREATMENT OF LIQUID METALS, AND PROCESS FOR THE PRODUCTION OF SAID ARTICLE

This application is a continuation of application Ser. No. 016,228, filed 2/19/87, abandoned.

The composite article having a tubular sheath and the process for the production thereof, to which the present invention relates, concern the treatment of liquid metals and in particular liquid steels.

Composite articles for such uses are already known, in particular from the documents set out below.

FIGS. 1, 1a to 1f and 2 of the present application permit the characteristics of the known articles to be better appreciated.

FIG. 1 shows a known process for forming a composite article,

FIGS. 1a to 1f show successive stages for forming the composite article using the process of FIG. 1, and FIG. 2 shows a portion of known composite article produced by the process of FIG. 1.

BRIEF DESCRIPTION OF THE DRAWINGS

FIG. 3 shows a section of the intermediate composite article used as the starting product in accordance with the present invention.

FIG. 4 shows the section of the article in FIG. 3 after forming of an open fold, in accordance with the invention, and FIG. 5 shows the composite article according to the present invention after closing of the initially open fold.

French Pat. No. 2 476 542 describes a process for the production of a tubular composite article which is used in particular for the introduction of additives into metal baths such as ladles containing liquid steel or distributor assemblies for continuous casting.

The tubular composite article comprises a casing or sheath, within which is disposed a material which is a compacted powder. When treating steel, the powder may contain for example CALCIUM.

That document describes a process for the production of that article. It comprises preparing a tubular sheath which is filled with the powder which is to be compacted, and then reducing the cross section of the article, with a substantially constant perimeter. Thus, the powder is compacted in situ, ensuring that it has an excellent level of positional stability. The same document describes a particular manner of producing that article.

The particular manner referred to above is described in greater detail in European patent application No. 34 994 and in particular FIGS. 1 and 1a to 1f which are reproduced in this application.

Figure 2:
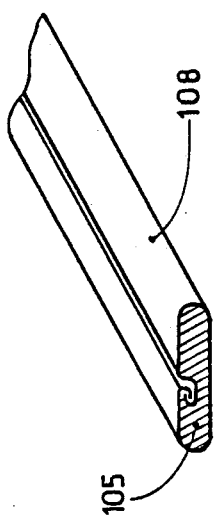

As will be seen from FIG. 1, a roll 10 delivers a metal strip 101 to a continous cold forming chain. A first series 11 of forming rollers 110 to 115 begins to deform the strip, imparting thereto a hollow profile 102 at the point a, as shown in FIG. 1a. At point b, as shown in FIG. 1b, the strip is of a cross section of gutter-like configuration, as indicated at 103, the two edges 116 and 117 thereof being so shaped that they can be subsequently attached to each other. At point c, see FIG. 1c, a distributor nozzle 120 fills the gutter member 103 with the treatment material in powder form, as indicated at 105. Preferably, a scraper means 125 in FIG. 1d levels off the material. A second series 13 of rollers 130 to 135 continues with the forming operation. The rollers 130 to 135 bring the edges 116 and 117 together and clasp them together at point e, see FIG. 1e, and then preferably crimp the connection which is formed in that way by crushing the join between the two edges at point f, see FIG. 1f. A third series 14 of rollers 140 to 145 deforms the sheath without substantial axial elongation while producing a reduction in section, with a constant perimeter, the section obtained having two parallel flattened regions as can be seen from the portion 108 shown in FIG. 2. That article is approximately of a rectangular shape with short rounded sides.

Preferably, the reduction in section is of the order of 15% at least.

Experience has shown that the above-described article gives satisfactory results in most cases. The flattened section thereof makes it particularly suitable to being wound on a drum and then unwound at the time that it is to be introduced into a metal bath.

However, because of the flattened section, the article is not as rigid as if it were of circular section. The rigidity of the article may be insufficient for the article to be introduced into the depths of certain metal baths which have a high level of density, especially if they are covered by a highly viscous slag.

For uses of that type, a composite article of substantially circular section could in principle give better results.

However, the operation of compacting powdery or granular material contained in composite articles of circular section gives rise to particular difficulties. If the compacting effect is insufficient, there is a risk of the material moving within the sheath. Moreover, the operation of winding such articles onto drums of small diameter and then subsequently unwinding them are relatively difficult, in particular if the compacting operation necessitated substantial plastic deformation of the sheath which makes it more rigid.

It is also found that such composite articles of circular section often have a tendency to become deformed in a spiral configuration as they are unwound from a drum, and that interferes with the introduction thereof into metal baths. If that spiral deformation of the article is excessive, the composite article does not penetrate into the depths of the bath but bends round and remains at the surface of the bath. When using a circular composite article with a sheath which is held together by a clasp-like connection, in the course of the operation of unrolling the article from a drum or in the course of the straightening operation which is carried out prior to introducing the article into the metal bath, it is also possible to observe unclasping of the sheath which then fails to perform its function of protecting the material contained therein.

Attempts were made to find a possible way of producing a composite material of substantial length, which is capable of being rolled and then unrolled, comprising a tubular metal sheath and a core consisting of a compacted powdery or granular material within the sheath, the composite article being of substantially circular cross section.

Attempts were also made to find a possible way of eliminating the risk of such an article suffering from deformation in a spiral configuration at the time of unrolling thereof prior to its introduction into the metal bath as well as the risk of the sheath coming partially unclasped when the sheath is itself closed by a clasping or hooking configuration.

The present invention provides a particularly effective solution.

The present invention concerns a composite article having a tubular sheath of great length, which is suitable for being rolled and then unrolled and in which the core of powdery or granular material is compacted within said sheath, the cross section of the article being substantially circular and the sheath comprising at least one fold which is closed on itself and whose fold edge is engaged into the interior of the article and the edges of which are connected to the peripheral zone.

Preferably, the sheath of the composite article is closed by a clasping or hooking configuration along a generatrix thereof. Preferably also, the article comprises a closed fold which is disposed substantially at the side that is diametrally opposite to the clasping or hooking zone. Advantageously also, the claspingzone is crimped in such a way that the two edges of the sheath, in the region where they overlap, are subjected to co-deformation. Advantageously also, the article may comprise as a particular means of crimping indentations in the clasping zone. The indentations are preferably small grooves which are substantially perpendicular to the generatrix of the sheath.

The composite article may comprise two closed folds which are disposed symmetrically in the section of the article, for example at 120° or 180° relative to each other, about the axis of the article.

For very many uses, the powdery or granular material contains one or more reactive elements in the free or combined state such as Ca, Ba, Mg, Na, B, Ti, Zr and/or rare earth metals and/or other elements such as Pb, Bi, Se, Te, S and C. The powdery or granular material may also contain other metals or non-metallic elements in the free state or alloyed or associated with other elements.

The present invention also concerns a process for the production of the composite article.

The process comprises preparing, using any method, a tubular metal sheath of substantially circular section, in the interior of which is disposed a non-consolidated powdery or granular substance, then deforming that sheath in a hollow configuration along a generatrix, without substantial elongation of the metal of the sheath, so as to form at least one open fold, then applying to the outside wall of the sheath pressure forces which are directed towards the interior of the composite article so as to reduce its outside diameter without causing substantial elongation thereof. As such deformation takes place with the perimeter of the article remaining constant, the fold or folds closes or close progressively. The outward edges of the fold or each of the folds move towards each other. That reduction in diameter causes corresponding compacting of the composite material contained in the sheath.

Preferably, the process according to the invention is carried out by preparing in a first phase an intermediate composite article comprising a metal sheath formed from a strip of metal and clasped or hooked along a generatrix. The sheath contains a non-consolidated powdery or granular material and it is of substantially circular section. Such an intermediate composite article may be prepared in particular by the known process described hereinbefore with reference to FIGS. 1 and 1a to 1f of this application. The substantially circular section of the intermediate article is shown in FIG. 1f and is not to be deformed by the rollers 14 in FIG. 1. From that stage, the sheath of the intermediate composite article is deformed along a generatrix by known means such as at least one roller or at least one die of suitable configuration so as to form, without substantial elongation, an open fold whose fold line penetrates into the powdery or granular material. The outside diameter of the composite article is then reduced by applying to the outside wall of the sheath pressure forces which are directed towards the interior thereof until the outward edges of the fold move together to a condition of being in the vicinity of each other, the side walls of the fold coming into contact with each other over a part at least of their surface.

The dimensions of the open fold are preferably to be so determined that the internal section thereof corresponds to at least 15% of the internal section of the intermediate composite article. If a plurality of folds are produced, it is the sum of the internal sections thereof which is to be considered.

Under those conditions, what is produced is a composite article in which the material contained therein has been compacted without substantial displacement and without a substantial increase in the length of the perimeter of the sheath.

Advantageously, the clasping or hooking engagement of the sheath of the article may be reinforced by a crimping action. It is advantageously possible to improve the strength of the crimped region by producing indentations which enhance the mechanical strength of the join and in particular prevent one of the edges of the sheath sliding relative to the other in the direction of the generatrix. Tests show that if such a sliding movement occurs, in particular in the course of the operation of rolling the composite article onto a drum and/or in the course of the subsequent unrolling operation, the composite article can assume the configuration of a spiral when it is introduced into a metal bath which is possibly covered with a slag. The indentations are advantageously produced by means of one or more rollers which have a toothed edge rolling over the clasping-engagement zone in such a way that the teeth plastically penetrate into the metal of the sheath. The teeth are advantageously of the desired configuration to form small grooves which are substantially perpendicular to a generatrix and which are of a width such that they cover at least the major part of the clasping zone over the width thereof.

Figure 5:
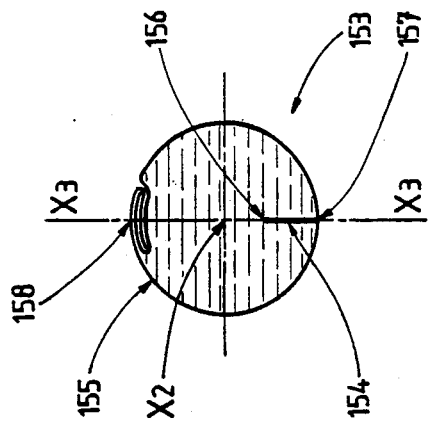
FIGS. 3 to 5 illustrate without limitation a particular way of producing the composite article according to the invention from the intermediate composite article.
Figure 4:
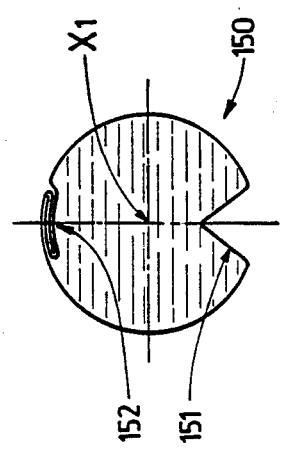
Figure 3:
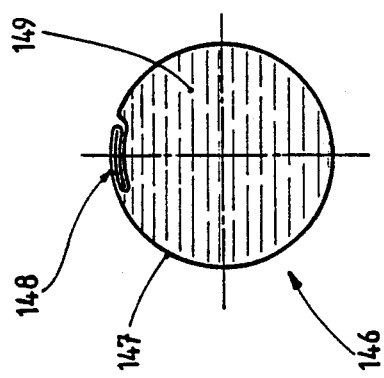

Referring to FIG. 3, shown therein is the section 146 of the intermediate composite article which is of substantially circular section and to which is applied the compacting method which forms part of the present invention. The sheath 147 of the composite article comprises a clasping zone 148 which is directed along a generatrix. The powdery or granular material 149 that it contains is not consolidate. Known forming means make it possible to produce the section 150 shown in FIG. 4. That section comprises an open fold 151 which is disposed in opposite relationship to the clasping zone 152 with respect to the axis X1 of the composite article. The aperture angle of the fold 151 and the depth thereof are determined in dependence on the degree of compacting which is to be achieved. Known means then make it possible to reduce the outside diameter, while closing the fold, by applying radial pressures to the sheath with the fold therein. FIG. 5 shows the compacted composite article 153 which is thus produced after closure of the fold 154, the sheath 155 having attained its diameter of use without a substantial variation in its periphery and without substantial elongation along the axis X2 of the article. The fold edge 156 of the fold is substantially parallel to the axis X2. It is disposed in the interior of the compacted material. The mutually facing walls of the fold 154 are practically in contact with each other over the major part of their surface area. They are connected by way of their outward edges to the periphery of the composite article along a generatrix 157 which is in diametrally opposite relationship to the clasping zone 158, with respect to the axis X2. That diameter X3—X3 constitutes a preferential axis of inertia which promotes rolling of the compacted composite article produced in that way and then unrolling thereof under conditions which minimize plastic deformation of the metal in the clasping zone. The risk of the sheath becoming unclasped or suffering from cracking is thus minimized. The risk of the edges of the sheath sliding relative to each other in the clasping zone is also minimized, thus greatly reducing the risk of the composite article assuming a spiral configuration when it is introduced into a metal bath.

The following example provides a quantitative description of a particular manner of producing the composite article according to the invention.

The process uses a mild steel strip measuring 60.5 mm in width and 0.4 mm in thickness. The granular material is an Si Ca alloy with 30% of Ca by weight. An intermediate composite article is produced in known manner, in which the sheath has a clasped zone of circular section with a diameter of 16.0 mm. An open fold is then produced opposite to the clasping zone which is then closed by radial pressure applied to the walls of the sheath. The fold is thus closed on itself, by reducing the outside diameter of the sheath to 13.2 mm. In the course of that operation, the apparent density of the Si Ca alloy goes from 1.61 to 2.08, which represents an increase in density of 29% corresponding to a reduction in section of the same order.

Many modifications may be made in the article and the process which are the subject-matter of the present invention. Depending on the use envisaged, the metal sheath of the article may be of a steel, aluminium or any other metal or alloy. The sheath may comprise a plurality of folds which are distributed differently depending on the conditions of use. Although the sheath is closed by clasping or hooking engagement in most cases, other forms of closure such as welding or the like may be envisaged. Finally, a very wide variety of metals, alloys or other elements or compounds may be used to form the powdery or granular material which constitutes the core of the composite article. The open fold may be produced by means such as rollers or dies of suitable configurations or by still other means, and it is also possible for the fold to be closed on itself by other means.

We claim:

1. A process for the production of a composite article for the treatment of liquid metals, the process comprising the steps of:
   (a) creating an elongated tubular metal sheath having substantially circular cross-section and with sheath securely closed to contain a non-consolidated material;
   (b) deforming the metal sheath in a hollow configuration along at least one generatrix;
   (c) at least partially folding the sheath along the deformation, the fold edge being disposed in the interior of the material;
   wherein folding the sheath reduces the outside diameter of the tubular sheath without substantially changing the length of the sheath perimeter and wherein the material is sufficiently compacted to avoid movement of the material within the sheath prior to use.

2. The process of claim 1 wherein the deformation is accomplished by at least one roller.

3. The process of claim 1 wherein the deformation is accomplished by at least one die.

4. The process of claim 1 wherein the elongated tubular metal sheath of step (a) is closed by having its edges clasped together along a generatrix.

5. The process of claim 4 wherein the sheath is folded at a location along the sheath opposite the location where the edges are clasped together with respect to the axis of the tubular metal sheath.

6. The process of claim 4 wherein the sheath is crimped along the clasped edges.

7. The process of claim 4 wherein the clasped edges contain indentations.

8. The process of claim 7 wherein the indentations are small grooves substantially perpendicular to the generatrix of the metal sheath.

9. The process of claim 8 wherein the length of the grooves is substantially equal to the width of the clasped edges.

10. The process of claim 8 wherein the indentations are made by rolling at least one teethed roller over the clasped edge to cause penetration.

11. A process to produce an improved composite article for the treatment of liquid metals, the composite article being a closed tubular metal sheath securely containing a non-consolidated material and having a substantially circular cross-section, the process for improvement comprising:
    (a) deforming the metal sheath along at least one generatrix; and
    (b) at least partially folding the sheath along the deformation, the fold edge being disposed in the interior of the material;
    wherein the outside diameter of the tubular sheath is reduced without substantially changing the length of the sheath and wherein the material is sufficiently compacted to avoid movement of the material in the sheath prior to use.

12. The process of claim 11 wherein the elongated tubular metal sheath has its edges clasped together along a generatrix.

13. The process of claim 12 wherein the sheath is folded at a location along the sheath opposite the location where the edges are clasped together with respect to the axis of the tubular metal sheath.

14. The process of claim 12 wherein the clasped edges contain indentations.

15. The process of claim 14 wherein the indentations are small grooves substantially perpendicular to the generatrix of the metal sheath.

16. The process of claim 15 wherein the length of the grooves is substantially equal to the width of the clasped edges.

17. A process for the production of a composite article for the treatment of liquid metals, the process comprising the steps of:

(a) forming a tubular metal sheath containing a non-consolidated material;

(b) securely clasping the edges of the tubular metal sheath;

(c) producing grooves along the clasped edge of the sheath;

(d) deforming the sheath along at least one generatrix; and (e) at least partially folding the sheath along the deformation, the fold edge being disposed in the interior of the material;

wherein the outside diameter of the tubular sheath is reduced without substantially changing the length of the sheath perimeter and wherein the material is sufficiently compacted to avoid movement of the material within the sheath prior to use.

18. The process of claim 17 wherein the grooves are perpendicular to the axis of the article and have length substantially equal to the width of the clasped edges.

19. The process of claim 17 wherein the sheath is folded opposite the clasped edge with respect to the axis of the article.

20. A process for the production of a composite article containing a compacted material for the treatment of liquid metals, the process comprising the steps of:

(a) creating an elongated tubular metal sheath having substantially circular cross-section by deforming the sheath and securely joining its edges, the sheath containing a non-consolidated material;

(b) deforming the tubular metal sheath in a hollow configuration along at least one generatrix without subjecting the sheath to substantial axial elongation to produce at least one open fold;

(c) at least partially folding the sheath along the deformation by applying radial pressure to the sheath, the fold edge being disposed in the interior of the material;

wherein folding the sheath reduces the outside diameter of the tubular sheath without substantially changing the length of the sheath perimeter and wherein the material is sufficiently compacted to avoid movement of the material within the sheath prior to use.

21. The process of claim 20 wherein the deformation is accomplished by at least one roller.

22. The process of claim 20 wherein the deformation is accomplished by at least one die.

23. The process of claim 20 wherein the elongated tubular metal sheath of step (a) has its edges joined together along a generatrix.

24. The process of claim 23 wherein the sheath has its edges clasped together along a generatrix for joining.

25. The process of claim 23 wherein the sheath is folded at a location along the sheath opposite the location where the edges are joined together with respect to the axis of the tubular metal sheath.

26. The process of claim 24 wherein the sheath is crimped along the clasped edges.

27. The process of claim 24 wherein the clasped edges contain indentations.

28. The process of claim 27 wherein the identations are small grooves substantially perpendicular to the generatrix of the metal sheath.

29. The process of claim 28 wherein the length of the grooves is substantially equal to the width of the clasped edges.

30. The process of claim 28 wherein the indentations are made by rolling at least one teethed roller over the clasped edges to cause penetration.

31. A process to produce an improved composite article for the treatment of liquid metals which can be rolled and unrolled without damage to the article, the composite article being a tubular metal sheath containing a compacted material and having substantially circular cross-section, the article formed from a metal sheath containing material which has its edges securely joined, the process for improvement comprising:

(a) deforming the metal sheath in a hollow configuration along at least one generatrix; and (b) at least partially folding the sheath along the deformation, the fold edge being disposed in the interior of the material;

wherein the outside diameter of the tubular sheath is reduced without substantially changing the length of the sheath and wherein the material is sufficiently compacted to avoid movement of the material within the sheath prior to use.

32. The process of claim 31 wherein the compacted material is granular.

33. The process of claim 31 wherein the elongated tubular metal sheath has its edges clasped together along a generatrix.

34. The process of claim 33 wherein the sheath is folded at a location along the sheath opposite the location where the edges are clasped together with respect to the axis of the tubular metal sheath.

35. The process of claim 31 wherein in step (a) the metal sheath is deformed in a "V" shape.

36. The process of claim 31 wherein the joined edges of the sheath have been hooked and clasped.

37. The process of claim 36 wherein the joined edges have been crimped.

* * * * *